A. C. TAYLOR.
ELECTRIC RESISTANCE WELDING.
APPLICATION FILED MAR. 11, 1922.

1,435,995.

Patented Nov. 21, 1922.

Inventor
A. C. TAYLOR.

Attorneys

Patented Nov. 21, 1922.

1,435,995

UNITED STATES PATENT OFFICE.

ALBERTIS C. TAYLOR, OF WARREN, OHIO.

ELECTRIC RESISTANCE WELDING.

Application filed March 11, 1922. Serial No. 542,876.

*To all whom it may concern:*

Be it known that I, ALBERTIS C. TAYLOR, a citizen of the United States, residing at Warren, in the county of Trumbull and State of Ohio, have invented certain new and useful Improvements in Electric Resistance Welding, of which the following is a specification.

This invention relates to an improvement in electrical resistance welding and has for an object, to provide a method and apparatus by means of which improved results are obtained in the welding of parts; the contacting faces of which are uneven or do not make perfect electrical contact over their entire meeting surfaces or in the welding of parts composed of different metals or alloys of metals. A further object is to provide mechanism which will create predetermined fluctuations in the current supplied to the welding circuit for each weld. Further objects will be apparent from the following description in connection with the annexed drawings.

Figure 1:
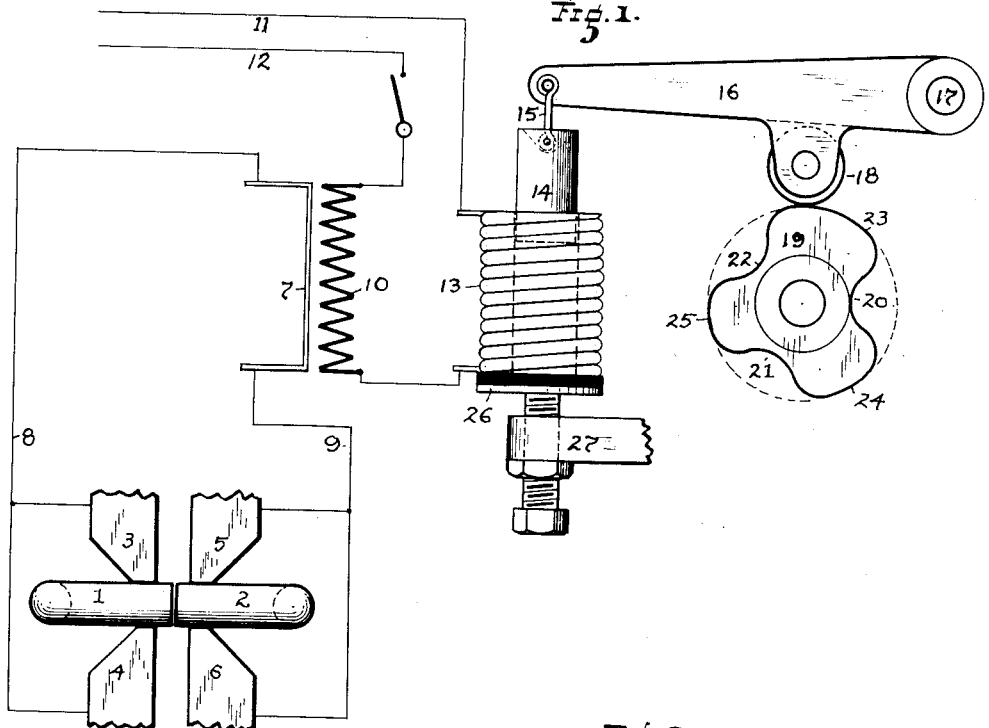
Fig. 1 is a diagrammatic view showing an apparatus which may be used in practicing my invention.

Referring to Fig. 1 of the drawing, the parts 1 and 2 to be welded are clamped in engagement with each other and between electrodes 3 and 4 and 5 and 6, respectively. The electrodes 3 and 4 are connected through a line 8 with one terminal of the secondary band or coil 7 of the transformer. The electrodes 5 and 6, are connected through a line 9 with the other terminal of the secondary 7. Current is supplied to the welding circuit through the transformer primary coil 10 in a supply circuit having lines 11 and 12 connected with a suitable alternating current source. In series with the primary coil 10 is a reactance coil 13 having a movable core 14 by means of which the impedance of the supply circuit can be increased or decreased. The core 14 is suspended by a link 15 from one end of a lever 16 pivotally supported on a fixed pin 17 at its opposite end. Intermediate the ends thereof the lever 16 carries on the under side thereof a roller 18 which is engaged by a cam 19. The cam 19 is provided with depressed portions 20, 21 and 22, of varying depths, the raised portions 23, 24 and 25 between the depressions 20, 21 and 22 being of varying width.

The pull of the coil 13 upon the core 14 presses the roller 18 against the surface of cam 19 so that the roller 18 upon rotation of the cam 19 follows the contour thereof permitting the core 14 to enter the core a distance corresponding to the depth of the depressions 20, 21 and 22 in the intervals during the rotation of the cam when these depressed portions are presented to the roller 17. The lowering of the core 14 into the coil 13 increases the impedance of the supply circuit and lessens the current through the welding circuit by an amount determined by the depth of insertion of the core within the coil. The cam 19 rotates at a constant speed during the welding operation, causing the current to fluctuate.

It has heretofore been common practice to intermittently break the circuit through the electrodes by mechanical means during the welding operation to prevent burning of the metal at the joint. This method, however, has distinct disadvantages, in that, where considerable current is used and the amperage is high, the switch contacts draw a large arc which burns away the contacts very rapidly changing the time the current is off and on, and also, since the arc varies in size and length and carries the current after the contacts of the switch have separated, it is impossible to break the current at uniform intervals. The cam 19, however, causes the current to be decreased, a predetermined amount at predetermined timed intervals during the welding operation and prevents excessive heating at the joint at the same time avoiding the difficulties encountered in the circuit-breaking method.

In making a weld, at the start, the parts are cold and a large volume of current may be applied without any danger of overheating or burning the metal as the metal approaches welding temperatures it is desirable that the heating effect of the current be retarded by causing the current to fluctuate. The raised portion 23 of the cam is wider than the raised portion 24 and the raised portion 24 is wider than the raised portion 25. If at the beginning of the weld the portion 23 is in engagement with the roller 18 the core 14 is held in fully raised position whereby the full current is supplied to the work while the portion 23 passes under the roller; the current is cut down while the depression 20 passes under the roll; full current is supplied during a shorter period while the raised portion 24 passes under the roll; again cut down by depression 21; again increased for a still shorter time by raised portion 25 and finally cut down by depression 22. By reason of the relative widths of the raised portions 23, 24 and 25 the volume of current and therefore the heating effect on the work is gradually decreased toward the end of the welding period. The coil 13 is supported upon a vertically adjustable support 26 carried by a stationary member 27. By adjusting the support 26 the depth of the core 14 in the coil may be varied and the impedance of the circuit correspondingly varied to supply a greater or lesser volume of current in the welding operation.

Figure 2:
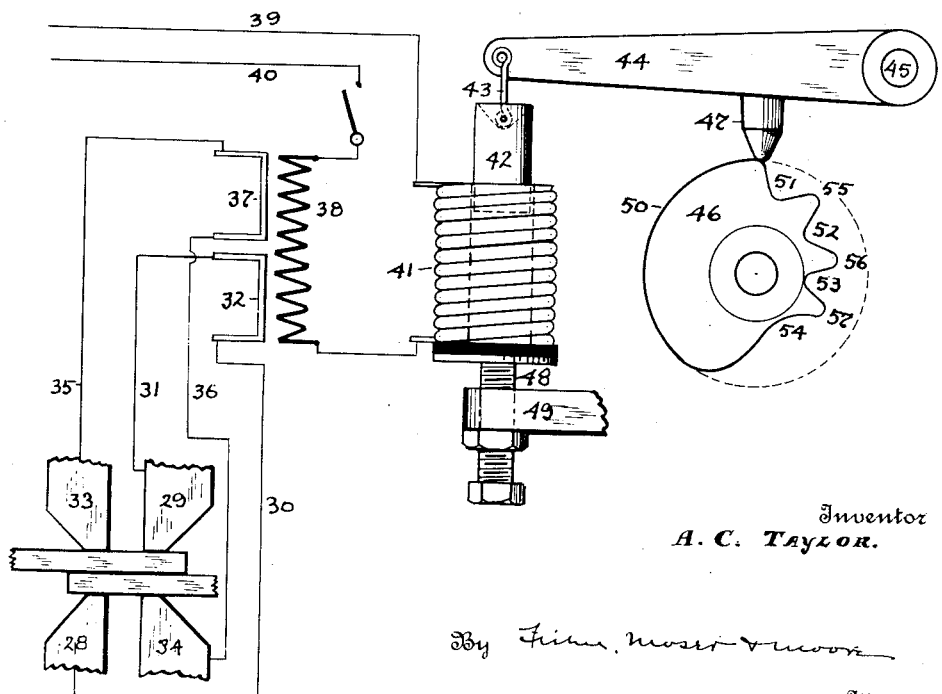
Fig. 2 is a diagrammatic view similar to Fig. 1 showing a modified form of the invention.

In the modification shown in Fig. 2, I have shown a welding circuit such as disclosed and claimed in my co-pending application Serial No. 182,139, filed July 23, 1917, in which the diagonally disposed electrodes 28 and 29 are connected by lines 30 and 31 to the terminals of one secondary 32 of the transformer and the other two diagonally disposed electrodes 33 and 34 are connected by lines 35 and 36 to a second secondary 37 of the transformer. The transformer has its primary coil 38 in a supply circuit having lines 39 and 40 connected with a suitable alternating current supply source. In series with the primary coil 38 is a reactance coil 41 having a movable core 42 suspended by a link 43 from one end of a lever 44 the other end of which is rotatably mounted upon a fixed pivot 45. The lever 44 carrying the core 42 is supported at varying elevations by means of a rotatable cam 46 engaging a downwardly extending lug 47 on the lever 44. The coil 41 is mounted upon a suitably insulated support 48 mounted for vertical adjustment on a fixed support 49. By adjusting the support 48 the depth of the core 42 in coil 41 can be regulated to increase or decrease the impedance of the supply circuit and to vary the current in the welding circuit.

The cam 46 has a portion 50 of uniform diameter and a series of depressions 51, 52, 53 and 54 alternating with raised portions 55, 56 and 57. The depressions 51, 52, 53 and 54 are of progressively increasing depth and the raised portions 55, 56 and 57 are of progressively decreasing height. The welding operation is preferably started when the lug 47 is resting on a portion of the smooth raised portion of the cam whereby a heavy current is supplied at the beginning of the weld. When the broken portion of the cam comes under the lug 47 the current is alternately decreased and increased as the lug 47 rides into the depressions 51, 52, 53 and 54 and over the raised portions 55, 56 and 57. By reason of the increasing depth of the depressions 51, 52, 53 and 54 and decreasing height of the raised portions 55, 56 and 57 the volume of current during the latter portion of the welding period is materially decreased.

In both modifications disclosed herein the fluctuations of current are entirely independent of the pressure upon the work; the work clamping means and the current regulating devices being entirely independent. The speed of rotation of the cams may be varied to suit the particular work being welded or cams of different configuration may be substituted. By adjustment of the reactance coil heavier or lighter currents may be supplied to the welding circuit.

What I claim, is—

1. The method of electric welding which consists in holding in contact the parts to be welded; passing a current through said parts; and creating at predetermined time intervals, fluctuations of a predetermined amount in said current repeatedly in the same area of contact.

2. The method of electric welding which consists in holding in contact the parts to be welded; passing a current through said parts and creating fluctuations in said current at predetermined time intervals repeatedly in the same area of contact during the welding period and decreasing the current volume toward the end of the welding period.

3. The combination with welding electrodes and the circuit in which the same are arranged; of means for supplying a current to said circuit; and mechanism for periodically at predetermined time intervals decreasing by a predetermined amount the current supplied to said circuit.

4. The combination with the welding circuit including the electrodes and secondary of a transformer; of a supply circuit including the primary coil of the transformer, a reactive coil in said supply circuit; a movable core for said coil; and means for periodically shifting said core.

5. The combination with the welding circuit including the electrodes and secondary of a transformer; of a supply circuit including the primary coil of the transformer, a reactive coil in the supply circuit; a movable core for said coil; and a cam having a series of depressions therein for periodically shifting said core.

6. The combination with the welding circuit including the electrodes and secondary of a transformer; of a supply circuit including the primary coil of the transformer; a reactive coil in the supply circuit; a movable core for said coil; a pivoted lever connected to said core; and means for periodically shifting said core comprising a cam engageable with said lever, said cam having a series of depressions of progressively increasing depth.

7. The combination with the welding circuit including the electrodes; of means for supplying current to said circuit during the welding period; and means for periodically at predetermined time intervals reducing the supply of current to said welding circuit, said means being adapted to decrease the volume of current toward the end of the welding period.

8. A method of electric welding, consisting in applying pressure to and passing an electric welding current through the parts to be welded while fluctuating the current variably.

9. A method of electric welding, consisting in applying pressure to and passing an electric welding current through contacting metal parts while creating an impedance in the electric circuit at intermittent intervals and progressively decreasing the volume of current.

10. A method of electric welding, consisting in applying pressure to the parts to be welded while passing a large volume of electric welding current for an interval through said parts and then continuing with a fluctuating current of lesser volume.

In testimony whereof I affix my signature to this specification.

ALBERTIS C. TAYLOR.